(No Model.) 2 Sheets—Sheet 1.
J. CONSER.
BEEHIVE.
No. 483,137. Patented Sept. 27, 1892.
FIG. 1.
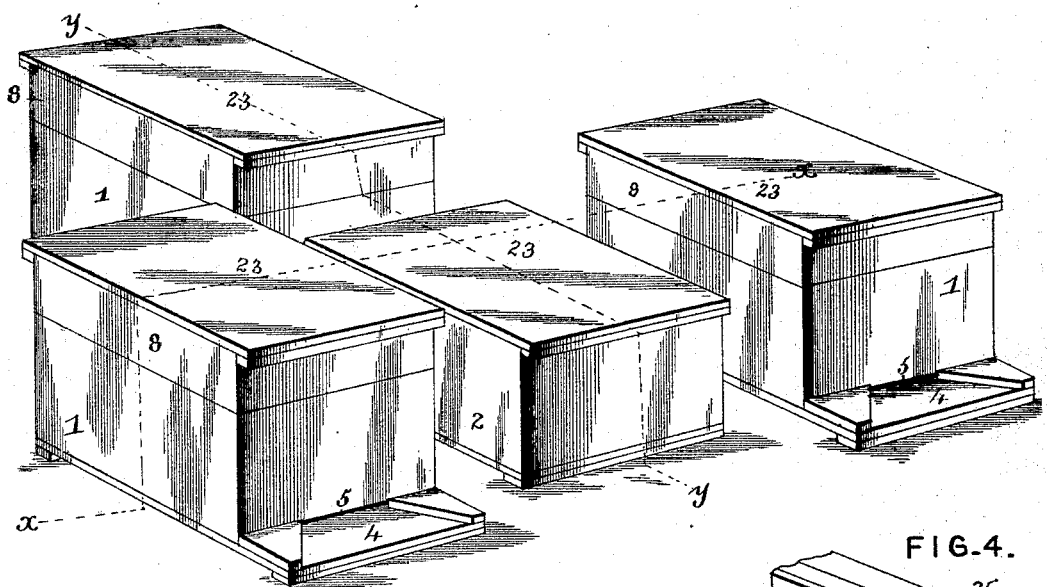
FIG. 5.
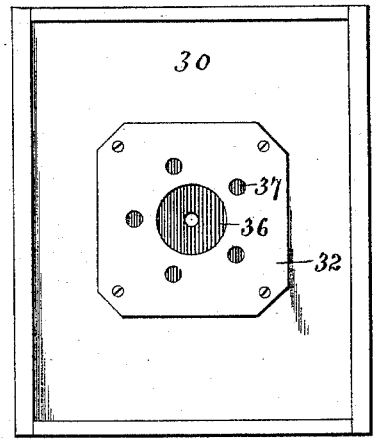
FIG. 6.
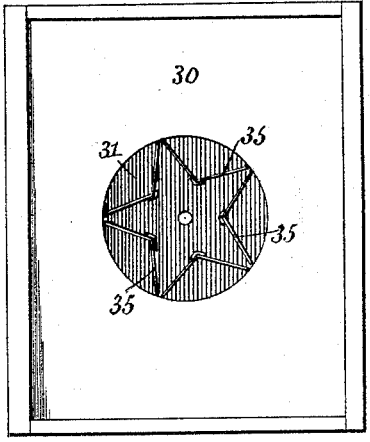
FIG. 4.
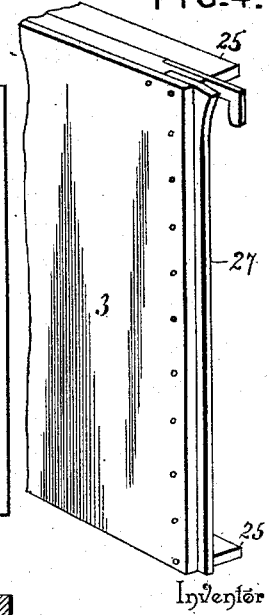
FIG. 7.
Witnesses
Jas. L. McCathran
N. F. Riley
Inventor
John Conser
By his Attorneys,
C. A. Snow & Co.

(No Model.) 2 Sheets—Sheet 2.
J. CONSER.
BEEHIVE.
No. 483,137. Patented Sept. 27, 1892.
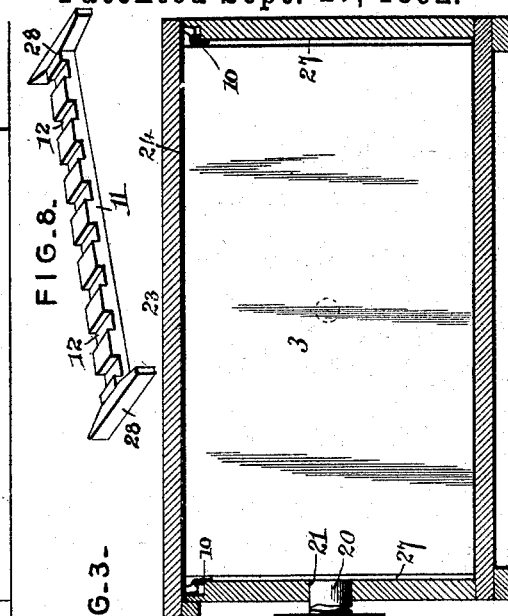
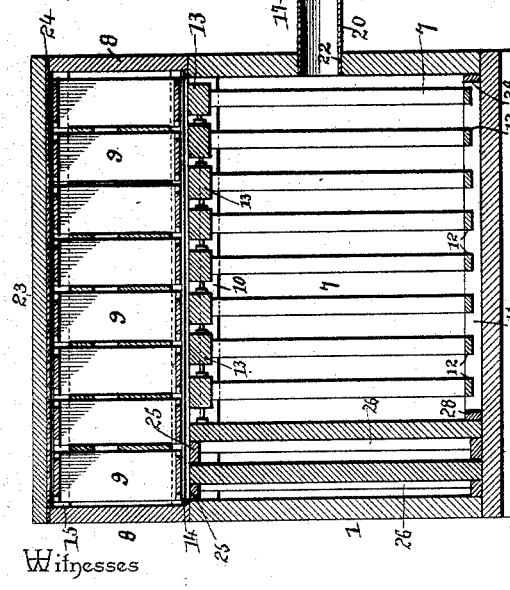
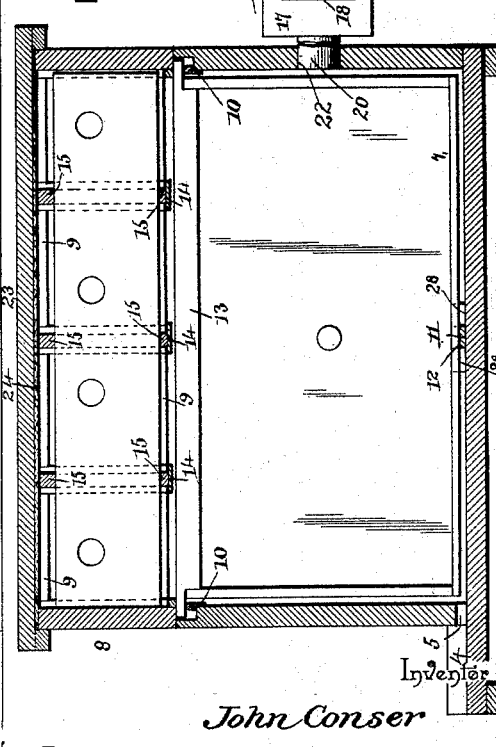
Witnesses
Jas. K. McCathran
N. J. Riley
Inventor
John Conser
By his Attorneys,
C. A. Snow & Co.
THE NORRIS PETERS CO., PHOTO-LITHO., WASHINGTON, D. C.

UNITED STATES PATENT OFFICE.

JOHN CONSER, OF SEDALIA, MISSOURI.

BEEHIVE.

SPECIFICATION forming part of Letters Patent No. 483,137, dated September 27, 1892.

Application filed October 29, 1891. Serial No. 410,259. (No model.)

*To all whom it may concern:*

Be it known that I, JOHN CONSER, a citizen of the United States, residing in Sedalia, in the county of Pettis and State of Missouri, have invented a new and useful Improvement in Beehives, of which the following is a specification.

The invention relates to improvements in beehives.

The object of the present invention is to improve the construction of hives and to effect an arrangement whereby hives will be continually supplied with workers, so as to produce a maximum amount of honey.

The invention consists in the construction and novel combination and arrangement of parts hereinafter fully described, illustrated in the accompanying drawings, and pointed out in the claims hereto appended.

In the drawings, Figure 1 is a perspective view showing hives arranged in accordance with this invention. Fig. 2 is a vertical sectional view on line $x\,x$ of Fig. 1. Fig. 3 is a similar view taken at right angles to Fig. 2 on line $y\,y$ of Fig. 1. Fig. 4 is a detail perspective view of one of the removable partitions. Fig. 5 is a plan view of the bee-escape. Fig. 6 is a reverse plan view of the same. Fig. 7 is a sectional view of the bee-escape. Fig. 8 is a detail perspective view of the recessed spacing-bar.

Like numerals of reference indicate like parts in all the figures of the drawings.

1 designates hives arranged on opposite sides of and connected with a hatching-box 2, which is divided by removable partitions 3 into three compartments, each communicating with one of the hives 1. The hives 1 are each provided at one end with an alighting-board 4 and a bee entrance or opening 5, and contains a series of brood-frames 7, arranged beneath a box or tray 8, forming an upper compartment and adapted to contain a series of honey-sections 9 for the surplus honey. The brood-frames are supported by sheet-metal strips 10, secured on the inner faces of opposite end walls of the hive near the upper edges thereof, and the said frames are spaced at their bottoms by a strip 11, arranged on the bottom of the hive and provided with a series of recesses 12 to receive the brood-frames. The end walls of the hive are recessed or rabbeted at their upper edges to receive the projecting ends of the top bar 13 of a brood frame.

The tray or box 8, which contains the honey-sections, is removable, and the honey-sections may, if found necessary, be arranged in tiers, and when it is desirable to remove the honey-sections, which are supported by transverse metal strips 14, secured to the lower ones of the top and bottom section spacing-bars 15, the tray or box may be inverted and the whole interior may then be readily pushed out of the box or rim.

The hatching-box is connected with the hives by excluding blocks and tubes, constituting queen-excluders 16, and is supplied from time to time with brood-frames from the hives, and after the bees are hatched they enter the hives through the queen-restricting blocks or excluders, and the brood-frames in the hatching-box are exchanged for others in the hives. By this arrangement the hives are continually supplied with workers and a maximum amount of honey is produced.

The queen-excluder consists of two blocks 17, secured together and having their inner opposed faces provided with recesses 18, a perforated plate 19, secured between the blocks and arranged opposite the recesses 18 and having its openings of a size to permit the passage of a worker, but small enough to prevent the passage of a queen bee, and tubular conductors 20, extending from the blocks and having their inner ends secured in openings of the same and their outer ends arranged in opening 21 of the hatching-box and opening 22 of the hive, whereby communication is established between the two.

The hives and the hatching-box are each provided with a cover 23, and fabric 24 is interposed between the cover and the brood-frames or honey-sections, as the case may be. The division boards or partitions 3, which are removable, are provided at their upper and lower edges with horizontal flanges 25 and are braced by cleats 26, and are provided at their ends with flexible strips 27, of rubber or similar material, arranged in kerfs. These partitions 3 may be arranged to form dead-air spaces at the side of a hive, as shown, to make the hives warmer in winter and cooler in summer. The rubber strips make a tight joint and enable the partitions to be arranged at any desired point; but the partitions 3 of the hives are braced to some extent by the strips or bars 11, which are provided with transverse end pieces 28, arranged to engage the partitions and the farther sides of the hives.

When the trays or boxes 8 are removed from the hives, bee-escapes 30 are employed, and each consists of a rectangular board having a central opening 31 and has secured to it upper and lower plates 32 and 33, arranged above and below the opening 31, which is circular and is provided on its lower face with a series of recesses 34, having inclined upper walls. Interposed between the upper and lower plates 32 and 33 are angle-pieces 35, secured at their apexes to the lower plate and disposed in the form of a five-pointed star, and forming at their ends contracted bee-openings arranged opposite the recesses to permit the passage of the workers to the brood-chamber, but not allowing them to return. The upper plate 32 is slightly elevated above the board and is provided with a central opening 36 and radially-disposed openings 37.

It will be seen that the arrangement of hives is simple and effective, that the hives are continually supplied with workers, so as to produce a maximum amount of honey, and that the queen bees are excluded from the hatching-box.

What I claim is—

1. The combination of a hatching-box provided with compartments adapted for the reception of brood-frames, hives arranged adjacent to the hatching-box and having brood-frames adapted to be placed into the compartments of the hatching-box, and conductors connecting the hives with the compartments of the hatching-box and provided with queen-excluders, substantially as and for the purpose described.

2. The combination of a hatching-box provided with an opening, a hive arranged adjacent to the hatching-box and provided with an opening, and a queen-excluder connecting the box and the hive and composed of two blocks secured together and having their opposed faces provided with recesses, a perforated plate interposed between the blocks, and tubular conductors extending from outer faces of the block and adapted to fit in the openings of the hatching-box and the hive, substantially as described.

3. A bee-escape comprising a board provided with a central opening and having recesses arranged at the sides of the opening, an upper plate secured to the board and arranged over the central opening and provided with openings, a lower plate secured to the board and arranged below the central opening, and the series of angle-pieces interposed between the plates and arranged in the form of a star and forming contracted bee-openings, substantially as and for the purpose described.

In testimony that I claim the foregoing as my own I have hereto affixed my signature in the presence of two witnesses.

JOHN CONSER.

Witnesses:
HERMAN SCHMITT,
HENRY KIPKEN.